(12) United States Patent
Mackey et al.

(10) Patent No.: US 11,353,252 B2
(45) Date of Patent: Jun. 7, 2022

(54) METHOD TO AVOID FAN CYCLING DURING LOW AMBIENT OPERATION

(71) Applicant: Lennox Industries Inc., Richardson, TX (US)

(72) Inventors: David Mackey, Addison, TX (US); Aylan Him, Coppell, TX (US); Zer Kai Yap, Allen, TX (US)

(73) Assignee: Lennox Industries Inc., Richardson, TX (US)

( * ) Notice: Subject to any disclaimer, the term of this patent is extended or adjusted under 35 U.S.C. 154(b) by 250 days.

(21) Appl. No.: 16/704,449

(22) Filed: Dec. 5, 2019

(65) Prior Publication Data

US 2020/0103152 A1 Apr. 2, 2020

Related U.S. Application Data

(62) Division of application No. 15/374,665, filed on Dec. 9, 2016, now Pat. No. 10,520,235.

(51) Int. Cl.

| | |
|---|---|
| *F25B 49/00* | (2006.01) |
| *F25B 49/02* | (2006.01) |
| *F24F 1/38* | (2011.01) |
| *F25B 6/02* | (2006.01) |
| *F25B 39/00* | (2006.01) |

(Continued)

(52) U.S. Cl.
CPC .............. *F25B 49/027* (2013.01); *F24F 1/38* (2013.01); *F25B 6/02* (2013.01); *F25B 39/00* (2013.01); *F24F 2110/12* (2018.01); *F24F 2140/12* (2018.01); *F25B 39/04* (2013.01); *F25B 2313/0294* (2013.01); *F25B 2313/0313* (2013.01); *F25B 2400/075* (2013.01);
(Continued)

(58) Field of Classification Search
CPC .................................................. F24F 2140/12
See application file for complete search history.

(56) References Cited

U.S. PATENT DOCUMENTS

| | | |
|---|---|---|
| 4,528,823 A | 7/1985 | Mochizuki |
| 10,520,235 B2 * | 12/2019 | Mackey ................. F25B 39/00 |

(Continued)

FOREIGN PATENT DOCUMENTS

| | | |
|---|---|---|
| EP | 0510 888 | 10/1992 |
| EP | 1 072 847 | 1/2001 |

(Continued)

*Primary Examiner* — Larry L Furdge
*Assistant Examiner* — Alexis K Cox
(74) *Attorney, Agent, or Firm* — Baker Botts L.L.P.

(57) ABSTRACT

A method of controlling an HVAC circuit, comprises allowing refrigerant to circulate within the HVAC circuit, wherein the HVAC circuit comprises an evaporator coil, a condenser coil, at least one fan configured to provide airflow to the condenser coil, at least one expansion valve, and at least one compressor. The method continues by receiving a temperature measurement and determining based on the temperature measurement, a minimum fan speed configured to avoid pressure spikes within the condenser coil. The method concludes by sending a signal to the at the least one fan to direct the at least one fan to spin at a rate greater than or equal to the minimum fan speed when the measured temperature is less than a predetermined temperature, wherein, when the refrigerant circulates through the condenser coil, the minimum fan speed is greater than zero rotations per minute.

10 Claims, 7 Drawing Sheets

(51) Int. Cl.
  *F24F 110/12*   (2018.01)
  *F24F 140/12*   (2018.01)
  *F25B 39/04*    (2006.01)

(52) U.S. Cl.
  CPC ....... *F25B 2500/06* (2013.01); *F25B 2500/07* (2013.01); *F25B 2500/31* (2013.01); *F25B 2600/111* (2013.01); *F25B 2600/17* (2013.01); *F25B 2700/195* (2013.01); *F25B 2700/2106* (2013.01); *F25B 2700/21161* (2013.01); *Y02B 30/70* (2013.01)

(56)     References Cited

U.S. PATENT DOCUMENTS

| | | |
|---|---|---|
| 2003/0014987 A1 | 1/2003 | Levenduski |
| 2003/0019235 A1 | 1/2003 | Wall |
| 2003/0120394 A1* | 6/2003 | Ziarnik .............. G05D 23/1912 700/300 |
| 2004/0020224 A1* | 2/2004 | Bash ........................ F25B 5/02 62/228.4 |
| 2005/0061012 A1 | 3/2005 | Zywiak et al. |
| 2005/0115255 A1* | 6/2005 | Wang ................ B60H 1/00785 62/176.6 |
| 2010/0162739 A1 | 7/2010 | Kopko |
| 2015/0276299 A1 | 10/2015 | Harvard, Jr. et al. |

FOREIGN PATENT DOCUMENTS

| | | |
|---|---|---|
| EP | 2 602 571 | 6/2013 |
| WO | WO 2009/155941 | 12/2009 |

* cited by examiner

METHOD TO AVOID FAN CYCLING DURING LOW AMBIENT OPERATION

CROSS-REFERENCE TO RELATED APPLICATION

This application is a divisional of U.S. application Ser. No. 15/374,665 filed Dec. 9, 2016 and entitled "Method to Avoid Fan Cycling During Low Ambient Operation," which is incorporated by reference in its entirety.

TECHNICAL FIELD

The present disclosure is directed to HVAC fan systems and in particular to fans and multi-stage condenser coils.

BACKGROUND OF THE INVENTION

In a typical HVAC system, refrigerant passes through a cycle. Refrigerant goes from a vapor to a liquid in a condenser (heat exchanger) as heat is lost to air passing outside the condenser, blown by a fan. The refrigerant then goes through an expansion valve which lowers the pressure. The refrigerant next passes through an evaporator, which converts the refrigerant from a liquid to a vapor as heat is received from air blown past the evaporator (heat exchanger) by a fan. The vapor refrigerant will then pass through a compressor which raises the pressure of the refrigerant, and then the refrigerant returns to the condenser.

A condenser can comprise a plurality of tubes exposed to air blown by a fan. The tubes can be divided into multiple groups or stages. For example, there can be three sets of tubes comprising first, second and third stages. The stages can be activated or closed depending on the system load. Typically there is a compressor associated with each stage. Often, between the stages there will be a "dead tube" that marks the boundary between each stage. Near the dead tube, or any frontier between stages, there can exist temperature or pressure differences between stages, causing strain in the condenser.

BRIEF SUMMARY OF THE INVENTION

One embodiment of the present disclosure comprises an HVAC circuit comprising: a plurality of condenser coils comprising a plurality of tubes configured to circulate refrigerant, and comprising a plurality of stages coupled to a plurality of compressors, wherein the stages are separated by a plurality of dead tubes and the plurality of condenser coils are fluidly coupled to other components of the HVAC circuit; a plurality of temperature sensors; a plurality of fans configured to provide airflow across the plurality of tubes; a controller configured to control the speed of the plurality of fans and to receive temperature measurements from the plurality of temperature sensors, the controller further configured to associate a measured temperature with a predetermined fan speed and to direct the fan to spin at a rate greater than or equal to the predetermined fan speed when the measured temperature is less than a predetermined temperature.

Another embodiment comprises an HVAC refrigeration circuit comprising: a condenser coil comprising a plurality of tubes configured to circulate refrigerant, and comprising first, second and third stages, wherein the stages are separated by a plurality of dead tubes and each stage is coupled to a respective compressor; a temperature sensor; a pressure sensor coupled to the liquid line of the condenser; a plurality of fans configured to provide airflow across the plurality of tubes; a controller configured to control the speed of the plurality of fans, to receive temperature measurements from the temperature sensor, to receive pressure measurements from the pressure sensor, and to control the activity of the first, second, and third stages and the respective compressors, the controller further configured, when a measured temperature is below a predetermined temperature, to associate the measured temperature with a fan speed to maintain pressure in the liquid line within a predetermined range, and the controller configured to adjust the fan to the fan speed.

Another embodiment comprises a method of controlling an HVAC circuit comprising: allowing, by a controller, refrigerant to circulate within the HVAC circuit, wherein the HVAC circuit comprises an evaporator coil, a condenser coil, a plurality of fans configured to provide airflow to the condenser coil, a plurality of expansion valves, and a plurality of compressors; receiving, at the controller, a temperature measurement; associating, by the controller, the temperature measurement with a predetermined fan speed configured to avoid pressure spikes within the condenser coil; and sending, by the controller, a signal to the fan motor to maintain fan speed at least as high as the predetermined fan speed.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

When cycling refrigerant through an HVAC system, such as a refrigeration circuit or a heat pump, it is common to blow air across the heat exchanger coils. The condenser coil can be subdivided into stages that may be activated or deactivated depending on the desired heating or cooling capacity of the system. For example, a condenser coil may have a first set of tubes for a first stage, a second set of tubes for a second stage, and a third set of tubes for a third stage. During low load conditions only the first stage may be used for circulating refrigerant. During medium or high stages, the second and/or third stages may be used in addition to the first stage. During use, the fan(s) directing air across the condenser coil may be turning off and on repeatedly, or cyclically, in response to load changes or under normal operating conditions. One purpose of the cycling may be to prevent freezing in or around the coil. The cycling off and on of the fan(s) can cause pressure changes in the condenser coil. The pressure changes can cause stresses as the material comprising the coil is heated and cooled at different rates at different locations. This problem is especially pronounced around tubes near the frontier between stages, or around dead tubes, the tubes that divide condenser stages from each other. This problem is also pronounced during low ambient temperature operation (less than 55° F., roughly, depending on pressure, humidity, or other factors). As a result of the fan cycling, tension and compression forces are created on the tubes that are directly above and below the dead tubes. The constant tension and compression can create a fatigue failure where the tube intersects the manifold or other locations.

One solution to the described problems is to avoid fan cycling by maintaining fan speed at a low but non-zero level. Preventing fan cycling maintains a constant liquid pressure, or a pressure within an acceptable range. How fast to spin the fan can be determined by ambient temperature, liquid line pressure, other temperature or pressure measurements, or other measured values in or near the system. Benefits of the present disclosure include: reduced stress on the condenser coil, especially areas near dead tubes; increased efficiency, and increased component life because of the reduced stresses. Because the pressures are not drastically fluctuating, the stress on the coil is reduced and the life of the coil is increased.

A solution under the present disclosure can be achieved through a processor or controller configured to monitor and control the HVAC system. On units operated through a central/unit controller, the controller could be programmed with a formula that controls the speed of outdoor ("OD") fan motors based on OD ambient temperature during low ambient operation. A unit controller may not need a separate electronic fan controller, a pressure switch, or a temperature switch (though such a system can also comprise these elements). This option can use a pre-programmed controller and ambient sensor to control fans speed in low ambient conditions.

Some HVAC units include a temperature switch but lack a controller. These units should preferably include a pressure transducer and an electronic fan controller to vary OD fan motor speed. In such embodiments, a temperature or pressure switch can turn ON/OFF some or all fans, or adjust fan speed, based on temperature or pressure readings, by sending signals to a fan controller. A pressure switch can activate the electronic fan controller and let it modulate the OD fans speed to maintain liquid pressure within a predetermined range (300 PSI 400 PSI in one possible embodiment involving aluminum coils). A temperature switch may associate a temperature reading with an associated pressure to allow temperature to be used as a proxy for pressure. Or the temperature switch may associate temperature with a power to supply to a fan.

Figure 1:
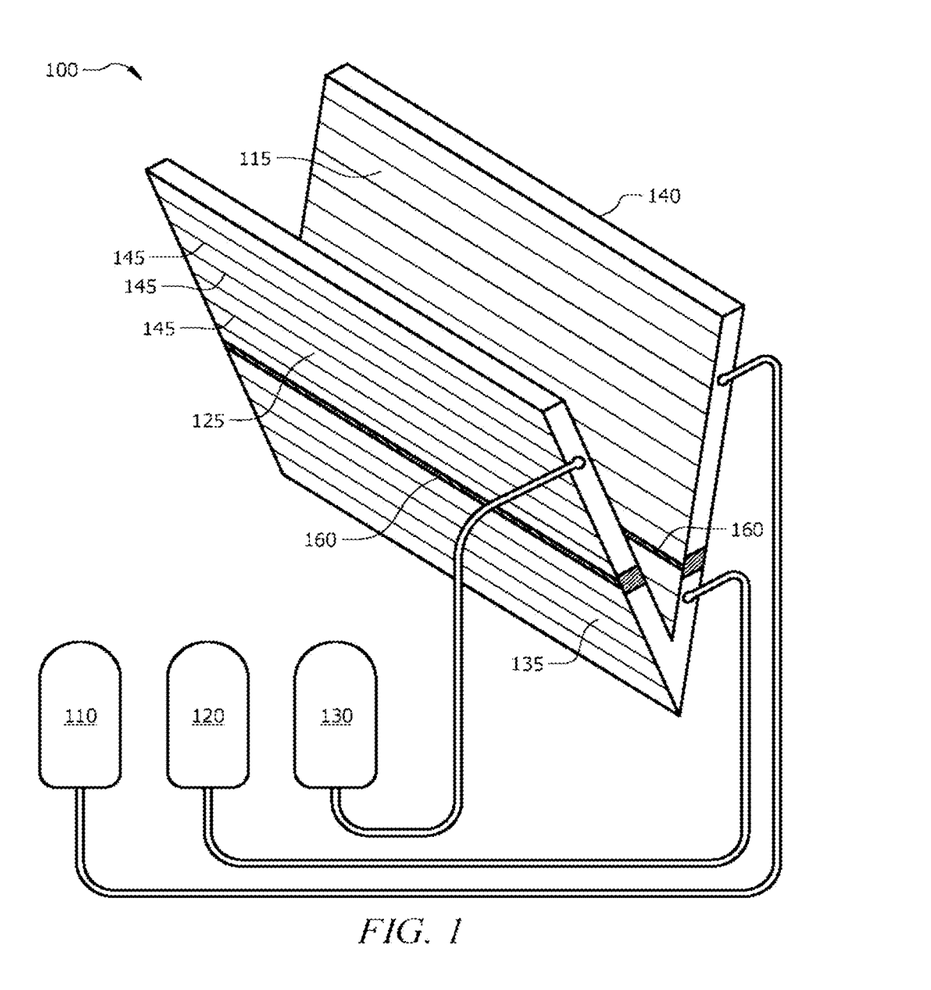
FIG. 1 is a diagram of a system embodiment under the present disclosure.

FIG. 1 displays a basic embodiment of a condenser coil and compressors for use in a system under the present disclosure. Other components of an HVAC system, such as expansion devices, controllers, temperature switches, fans, evaporators, and more, are not shown in this figure, but it is to be understood that the condenser and compressors shown can connect to such components. System 100 comprises a plurality of compressors 110 (first), 120 (second), 130 (third) and a multistage condenser coil 140 with stages 115 (first), 135 (second), 125 (third). Other embodiments can comprise additional stages. In this embodiment, the second stage 135 comprises tubes on both sides of the condenser coil 140. The stages can be used independently of each other. Condenser 140 comprises a plurality of tubes 145 within each stage that can transport refrigerant across the condenser. A plurality of fans (not shown) can be located above the condenser 140. As air passes over the tubes 145 they remove heat from the refrigerant and the refrigerant condenses from a vapor to a liquid. Dead tubes 160 separate first stage 115 from third stage 125, and second stage 135 from third stage 125. Tubes 145 that are near dead tubes 160 (usually within one or two tubes of tubes 160) suffer stresses from compression and expansion as fans cycle on and off during use. This problem is especially pronounced during low ambient temperatures as the condenser may only use a first and/or second stage 115, 135. During higher temperature or higher load conditions, all three stages 115, 125, 135 may be in use and the fatigue issues described herein are less pronounced or non-existent. During low ambient temperature conditions, one side of a dead tube 160 may have refrigerant while the other side has no refrigerant. The material of the coil therefore undergoes different pressure and temperature changes at different locations, leading to fatigue.

To minimize the temperature and pressure changes around the dead tubes, the teachings of the present disclosure include preventing the fans above the condenser coil (not shown in FIG. 1) from turning off instead the fans are maintained at a low speed during periods when a higher speed is not required. Solutions under the present disclosure have been found especially beneficial in system comprising aluminum-based condenser coils. However, the teachings can be applied to systems comprising other metals and materials. For aluminum, it is generally desired to keep strains around the dead tube under 500 microstrain (µstrain). This value can change for different alloys, metals, and materials used in the condenser. The teachings under the present disclosure can also be especially beneficial for microchannel or tube and fin coils. However, the teachings can be applicable to other systems.

Other embodiments under the present disclosure may not comprise a dead tube. In such embodiments, a coil may exclude a dead tube and instead have fins, or nothing, between stages of the condenser. Such systems can still suffer stresses and strains from temperature and pressure changes during fan cycling. The present disclosure can be applied to such embodiments.

Figure 2:
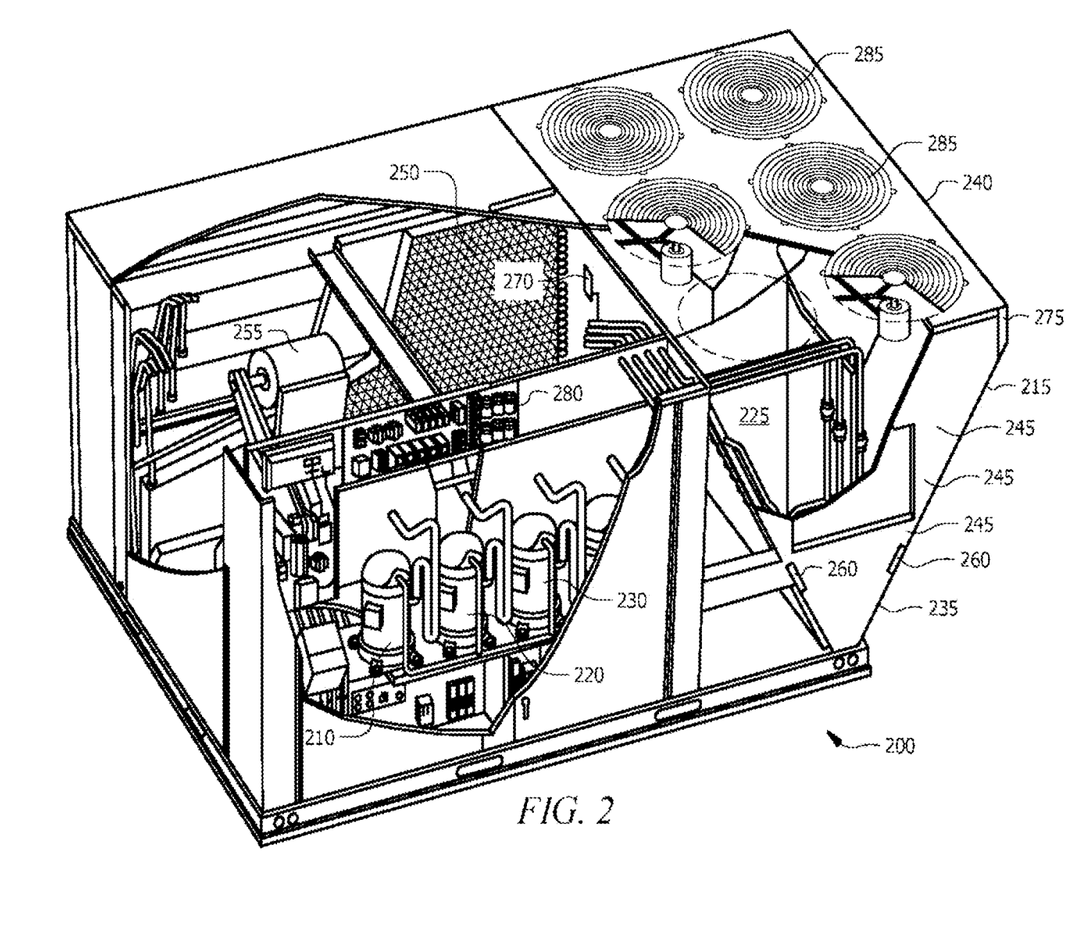
FIG. 2 is a diagram of a system embodiment under the present disclosure.

FIG. 2 shows another embodiment under the present disclosure. HVAC system 200 comprises a V-shaped condenser 240 comprising first 215, second 235, and third 225 stages, that are respectively connected to first 210, second 220, and third 230 compressors. Other components include an evaporator coil 250 and a blower 255. Condenser 240 comprises a plurality of tubes 245 and dead tubes 260 which separate the stages from each other. Fans 285 are located above condenser 240 and provide airflow across tubes 245. Fan controller 280 is connected to the fans 285 and is operable to direct the speed and activity of fans 285. Fan controller 280 is also connected to pressure switch 270 and ambient temperature sensor 275. In this embodiment pressure switch 270 is connected to the liquid line leaving the condenser 240. However, a pressure switch can be utilized that is located at different locations within system 200, for example at the condenser inlet. Furthermore, while temperature sensor 275 measures ambient temperature, a temperature sensor could be placed elsewhere and the system could be run off temperature readings from another location, such as any line connected to the condenser, compressor, evaporator or other components. Fan controller 280 is connected to both the temperature sensor 275 and the pressure switch 270. Fan controller 280 receives readings or signals from sensors 270, 275 and is operable to adjust the speed of fans 285 in response. Commonly, pressure fluctuations are greatest when the ambient temperature drops below about 53° F. What temperature is the boundary for low ambient temperature operation can depend on a variety of factors such as altitude, coil material, and more. In this embodiment 53° F. is used as an example. Pressure spikes can occur in the condenser 240 when fans 285 turn off, when the fans turn on there can be an abrupt pressure drop. These spikes/drops are exacerbated below 53° F. because low ambient temperatures allow for a third stage 225 to be turned off (or a different stage, or multiple stages, may be turned off). The fan controller 280 can be configured to, when the pressure drops below 53° F., maintain the fans on at all times, though at slow speeds if a higher speed is not required. In one embodiment, the fan controller can adjust the fan speed to maintain a pressure at the condenser liquid line of 300-350 PSI. This desired value can depend on the refrigerant being used, condenser material, or other factors. In other embodiments, the fan controller can be connected to a pressure switch at the inlet to the condenser, in which case the desired pressure may be higher, as the pressure naturally drops across the condenser. The embodiment of FIG. 2 may be most useful in a retrofit embodiment.

Figure 3:
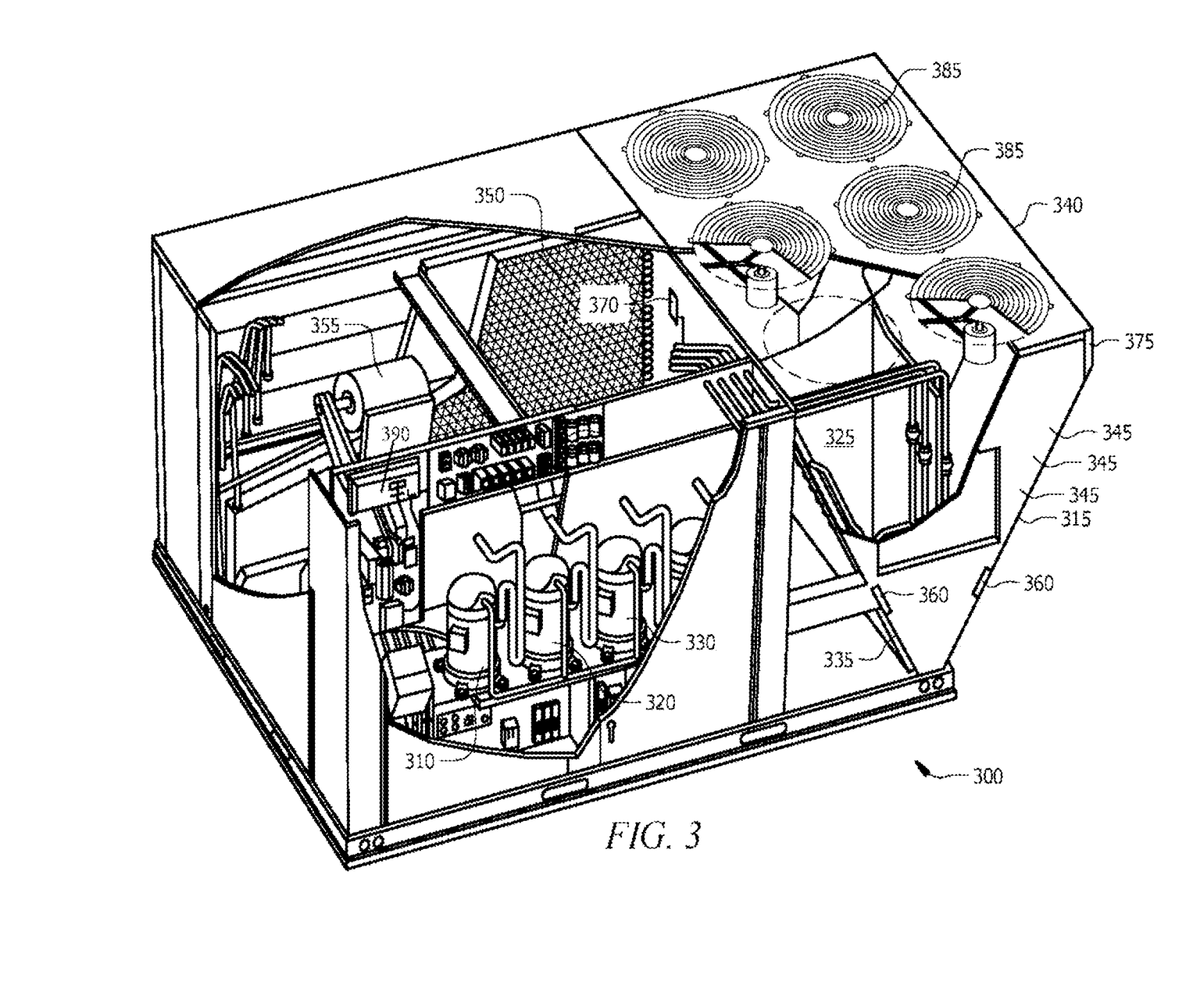
FIG. 3 is a diagram of a system embodiment under the present disclosure.

FIG. 3 displays another embodiment of a solution under the present disclosure. The HVAC system 300 comprises a condenser coil 340 with stages 315, 325 and 335, compressors 310, 320, 330, blower 355, evaporator coil 350 and further components. FIG. 3 differs from FIG. 2 in that it presents a software-centric system with a central/unit controller. Controller 390 can comprise a plurality of processors, display screens, and connections to components of the system 300. Controller 390 can receive temperature measurements from temperature sensor 375 and pressure readings from pressure sensor/switch 370. Multiple pressure and temperature sensors can be used. Controller 390 can receive measurements from other components within system 300. Controller 390 can also control various functions within system 300. It can open and close stages 315, 325, 335 of the condenser 340 and the respective compressors 310, 320, 330. Fan speed can also be adjusted by controller 390. To avoid the stresses and fatigue described above, controller 390 can maintain fan speed greater than zero during low ambient temperature operation (such as, for example, below 53° F.). Typically, controller 390 can monitor pressure at the liquid line leaving the condenser and, for a typical configuration, maintain pressure at 300-350 PSI (depending on refrigerant type, condenser material, and other factors). Controller 390 can comprise a wireless or wired telecommunication connection, such as Wi-Fi, Bluetooth, telephone line, DSL line, or other types of connections. Such connections can allow communications with a remote or central server that monitors or controls the HVAC unit, or a plurality of HVAC systems.

When implementing a solution under the present disclosure, the exact fan speed necessary to achieve a desired pressure within the condenser may need to be determined by testing a system with a specific refrigerant. Each condenser can comprise different materials (aluminum, copper, etc.). Furthermore, different refrigerants have different expansion rates and react to pressure and temperature differently. One example of such experimentation can be seen in FIG. 4. The trials shown in FIG. 4 were carried out with an aluminum coil. Graph 410 displays stresses measured within condenser tubes during use. The spikes on the left hand side of the graph show the stresses present before the present teachings are applied. Spikes in the stresses roughly correlate with periods where the fan is turned off. As the fan(s) cycles on and off the stresses spike up and down. On the right hand side of the graph, some of the present teachings have been applied instead of cycling the fan on and off the fan is maintained at a low speed during "off" periods. As seen, the stresses are maintained at a smaller level, avoiding the deleterious spikes associated with the left hand side of the graph. Graph 410 shows stresses, but a graph of pressure measurements would roughly match graph 410. The system can be tested at different ambient temperatures to determine how much power to apply to a fan in different circumstances. Graph 450 shows the results of varying temperature and a PWM (pulse width modulation) signal that powers a fan. PWM is a percentage of the maximum setting for the fan used. The results shown are limited to a specific condenser set up, material, refrigerant, and other factors. Analyzing the results yields an equation relating OD ambient temperature to PWM. In this case, $PWM=1.44(OD_{amb})-23.2$. An equation such as this can be programmed into a controller, such as controller 390 in FIG. 3. The equation, or a set of temperatures and associated fan speeds, can be programmed into a temperature switch (or a pressure switch in some embodiments) and an electronic fan controller, such as in FIG. 2. Depending on the ambient temperature measured by temperature sensor 375, the controller 390 can adjust power to the fans 385 as necessary.

Figure 4A:
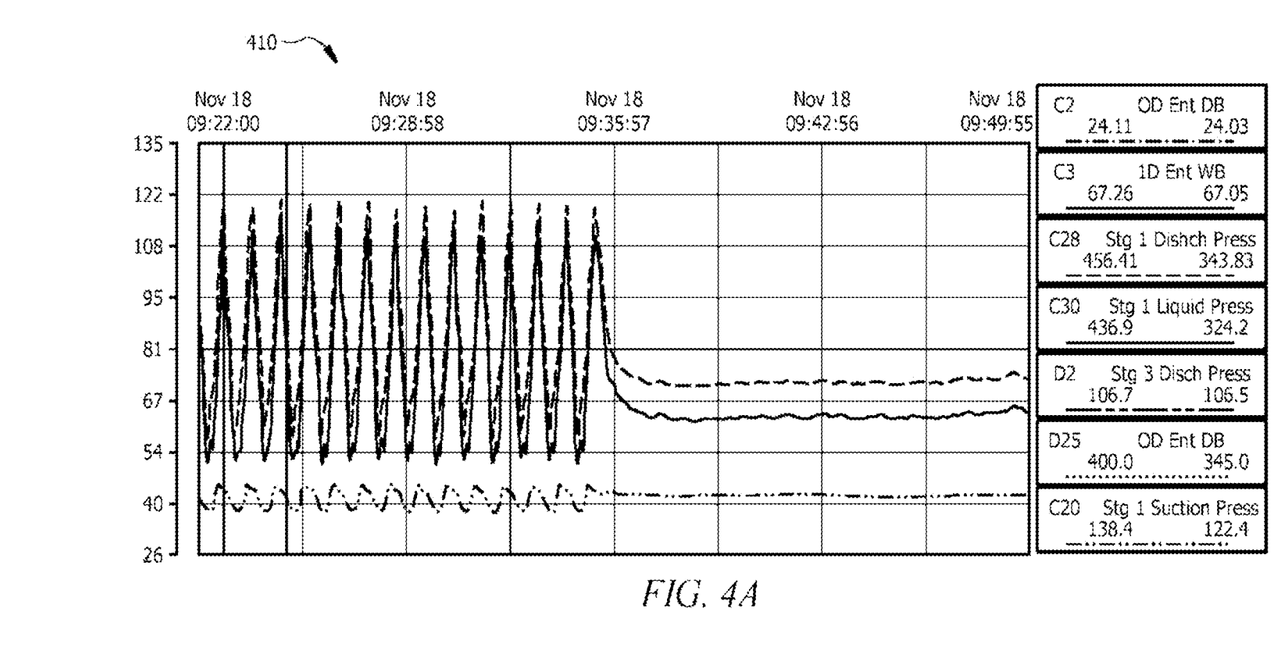
FIGS. 4A and 4B are diagrams of experimental data illustrating some of the teachings of the present disclosure.
Figure 4B:
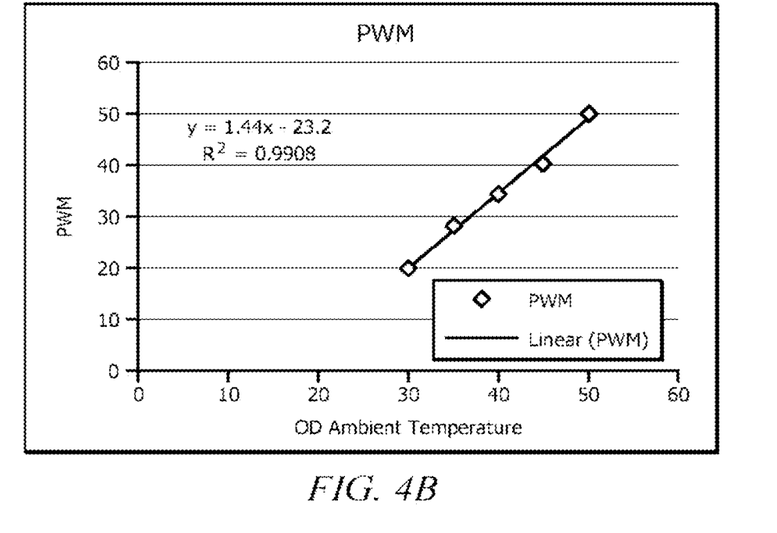

While FIG. 4 shows a relation from ambient temperature to PWM, other embodiments may use a different temperature value. For example, a temperature inside the system 300, or condenser 340 can be used. A resulting relation between temperature and PWM will vary from the scenario involving ambient temperature, but a consistent relationship can be measured and an equation similar to that in FIG. 4 can be found. The use of a temperature different than the ambient may be necessary where the most accurate measurement is at a different location.

In some embodiments, the equation of FIG. 4 will only be used below a certain temperature threshold, for example 53° F. In other embodiments, the equation can be used across a broader range of temperatures. Another embodiment of the present disclosure can, instead of using an equation, set fan speed to have a minimum speed (1 rpm, 5 rpm, 10 rpm, or other) when temperature drops to equal or below a certain value (for example, 53° F.).

Figure 5:
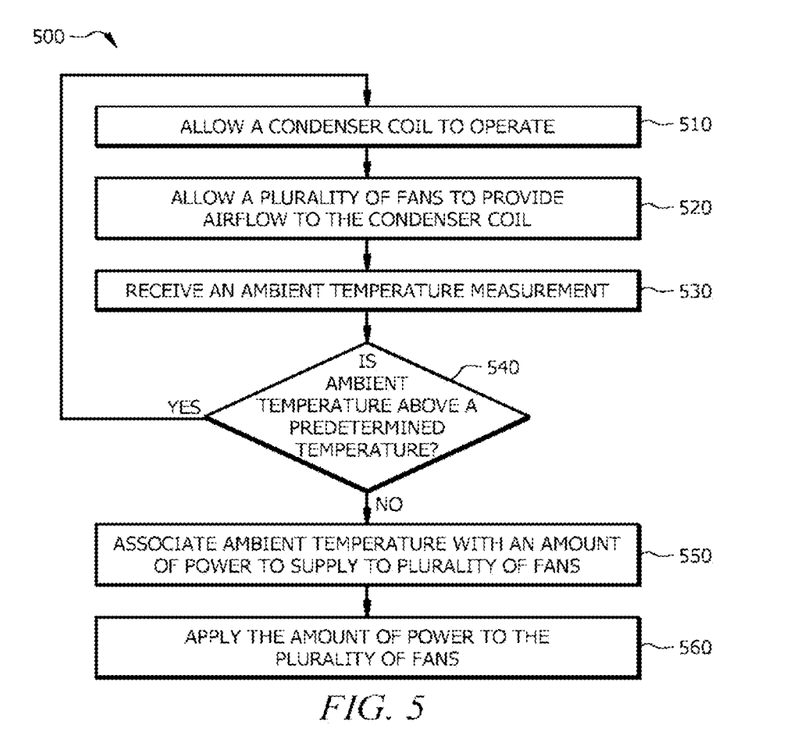
FIG. 5 is a flow chart diagram of a method embodiment under the present disclosure.

FIG. 5 displays a method embodiment for practicing some of the teachings of the present disclosure. At 510, a condenser coil is allowed to operate as part of an HVAC system. At 520, a plurality of fans is allowed to provide airflow to the condenser coil. At 530, an ambient temperature measurement is received. At 540, the ambient temperature is compared to a predetermined temperature. If the ambient temperature is above the predetermined temperature then the process returns to step 510. If the ambient temperature is below the predetermined temperature, then the process proceeds to step 550. At 550, the ambient temperature is associated with an amount of power to supply to the plurality of fans. At 560, the amount of power is supplied to the plurality of fans. The process then returns to step 530, where an ambient temperature is received. The method described above allows the HVAC system to avoid pressure and strain spikes within the condenser coil, especially around dead tubes, by preventing the fan speed from reaching zero (or a low non-zero temperature that causes pressure or strain spikes in the condenser) during conditions of low ambient temperature.

Figure 6:
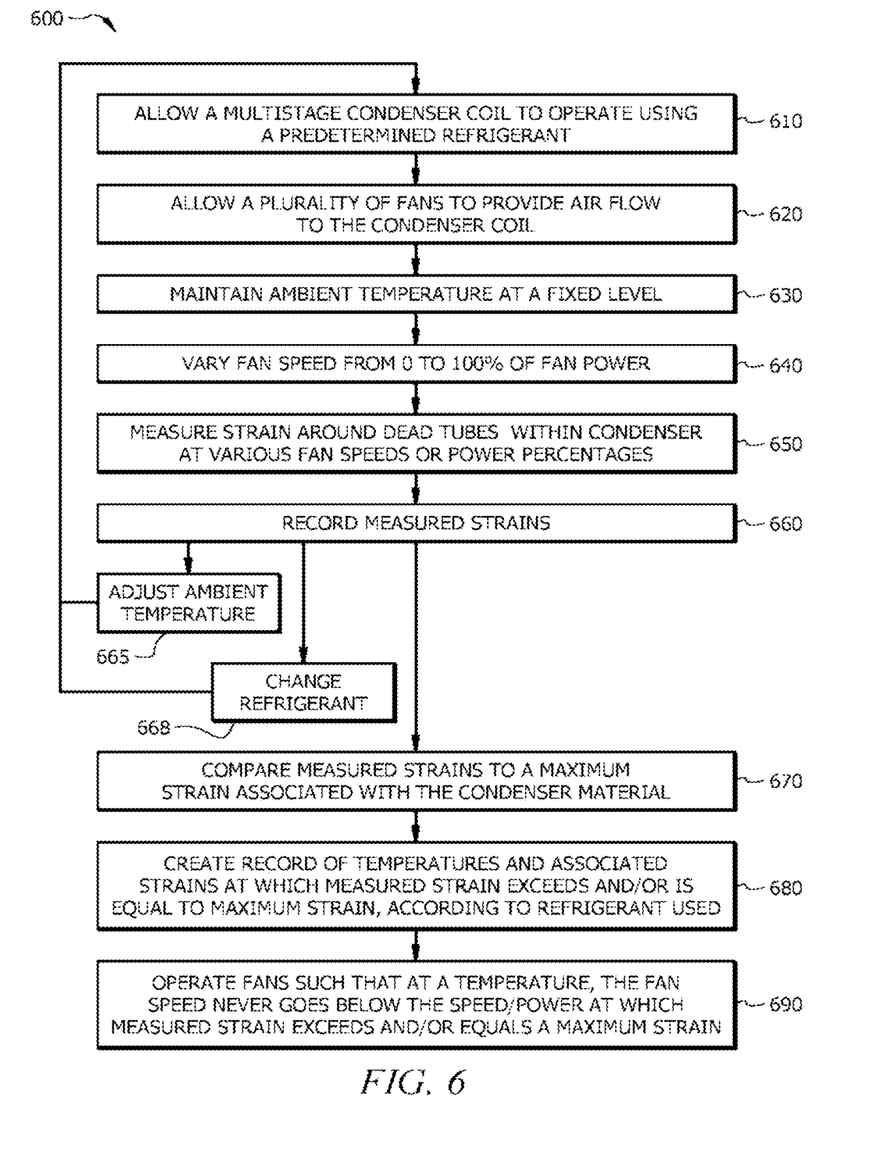
FIG. 6 is a flow chart diagram of a method embodiment under the present disclosure.

FIG. 6 displays a method for determining what fan speeds can be associated with a condenser coil at given temperatures. The results of method 600 can include a table of values, an equation relating fan speed to temperature, or a data record of any appropriate format for a users preferences, such that it can be used by a fan controller or HVAC controller to monitor and control fan speed. At 610, a multi-stage condenser coil is allowed to operate using a predetermined refrigerant. At 620, a plurality of fans are allowed to provide airflow to the condenser coil. At 630, the ambient temperature is maintained at a fixed level. At 640, fan speed is varied from zero to 100% of fan power (or alternatively varied through a range of speeds, or a range of powers). At 650, strain is measured around or near the dead tubes within the condenser at the various fan speeds or powers. At 660, the measured strains are recorded. At 670, the measured strains are compared to a maximum strain associated with the condenser material. At 680, a record is created of temperatures and associated strains at which measured strain exceeds and/or is equal to a maximum strain, according to refrigerant used. At 690, the fans are operated such that at a given temperature, the fan speed never goes below the fan speed or power at which measured strains exceeds and/or equals a maximum strain. At 665, a user may adjust the temperature and run through steps 610 to 660 for the new temperature. The user may repeat this for a number of temperatures, and then proceed to steps 668 or 670. At 668, the user may change the refrigerant used and repeat steps 610 to 660 or 610-665 for a new refrigerant. After the user has gone through the desired temperatures, or any alternative refrigerants, then steps 670 to 690 can be completed. The results of process 600 can provide a user with a relationship between fan speed and ambient temperature, and can help determine what fan speed is needed in the condenser coil to avoid strains that cause fatigue in the condenser. The data from process 600 can be used to create a best fit graph, such as in FIG. 4, or a collection of data that help determine fan speed. The steps of process 600 can be adjusted according to a user's needs. For example, a temperature besides the ambient temperature may be used. A user may choose to not vary the temperature or the refrigerant.

Figure 7:
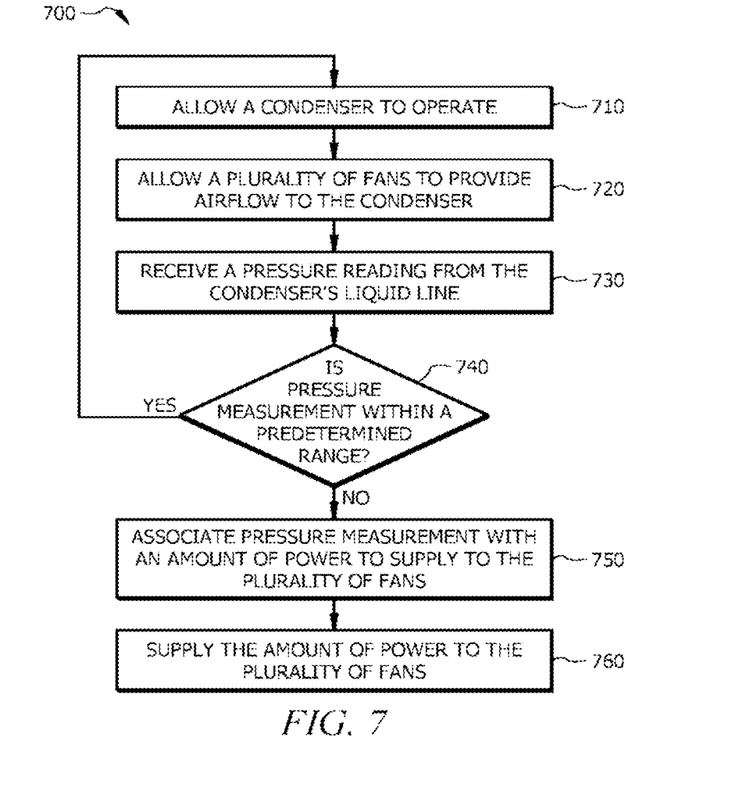
FIG. 7 is a flow chart diagram of a method embodiment under the present disclosure.

Another embodiment, seen in FIG. 7, of a method of fan cycling under the present disclosure involves basing the fan speed on a pressure reading from the liquid line of the condenser. Process 700 includes, at 710 allowing a condenser to operate. At 720, a plurality of fans are allowed to provide airflow to the condenser. At 730, a pressure reading from the condenser's liquid line is taken or received. At 740 it is determined if the pressure measurement is within a predetermined range (such as 300-350 PSI, or 300-450 PSI, or others). If the pressure measurement is within the range, then the process returns to 710. If not, the process proceeds to 750, and the pressure measurement is associated with an amount of power to supply to the plurality of fans. At 760, the amount of power associated with the pressure measurement is supplied to the plurality of fans. The process can then return to step 710.

Other embodiments of the present disclosure can comprise a controller that is remote to the condenser/HVAC system disclosed. For example, a central command center may be communicatively coupled to a local controller of a unit. The central command may direct fan speed and condenser behavior, along with controlling other aspects of an HVAC system.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of controlling an HVAC circuit, the method comprising:
   circulating refrigerant within the HVAC circuit, wherein the HVAC circuit comprises an evaporator coil, a condenser coil, at least one fan configured to provide airflow to the condenser coil, at least one expansion valve, and at least one compressor;
   receiving, at a controller, a temperature measurement;
   determining, by the controller, based on the temperature measurement, a minimum fan speed configured to avoid pressure spikes within the condenser coil; and
   sending, by the controller, a signal to the at the least one fan to direct the at least one fan to spin at a rate greater than or equal to the minimum fan speed when the measured temperature is less than a predetermined temperature, wherein, when the refrigerant circulates through the condenser coil, the minimum fan speed is greater than zero rotations per minute.

2. The method of claim 1 wherein there is a linear relationship between the measured temperature and the minimum fan speed.

3. The method of claim 1 wherein the associating and the sending are only done when the measured temperature is below 53° Fahrenheit.

4. The method of claim 1 wherein the measured temperature is associated with a maximum strain near at least one dead tube in the condenser coil, and the sending of the signal to the fan motor prevents the condenser coil from experiencing the maximum strain.

5. The method of claim 1 wherein the temperature measurement is a measurement of ambient temperature.

6. The method of claim 1 wherein the predetermined temperature is 55° Fahrenheit.

7. The method of claim 1 wherein the measured temperature is associated with a maximum strain near a frontier between two stages of the condenser coil, and directing the at least one fan to spin at a rate greater than or equal to the predetermined fan speed prevents the at least one condenser coil from experiencing the maximum strain.

8. The method of claim 1 wherein the condenser coil comprises aluminum.

9. The method of claim 1 wherein the condenser coil comprises copper.

10. The method of claim 1 wherein the condenser coil comprises micro-channels.

\* \* \* \* \*